US006169942B1

(12) United States Patent
Miller et al.

(10) Patent No.: US 6,169,942 B1
(45) Date of Patent: Jan. 2, 2001

(54) PROCESS FOR DETERMINING THE TIME ELAPSED BETWEEN STOPPING A MOTOR VEHICLE ENGINE AND RESTARTING THE ENGINE.

(75) Inventors: Norbert Miller, Abstatt; Hans Deichsel, Murr; Klaus Joos, Walheim; Harald Pietsch, Freiberg, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/834,262

(22) Filed: Apr. 15, 1997

(30) Foreign Application Priority Data

May 31, 1996 (DE) .............................................. 196 21 900

(51) Int. Cl.[7] ........................................................ G06F 1/14

(52) U.S. Cl. .............................. 701/29; 701/35; 701/102; 60/248

(58) Field of Search .................................. 701/29, 30, 35, 701/102, 103, 105; 60/248

(56) References Cited

U.S. PATENT DOCUMENTS 4,723,523 * 2/1988 Dataoka et al. ...................... 123/491
5,727,384 * 3/1998 Ma ......................................... 60/284
5,941,915 * 8/1999 Federle et al. ........................... 701/1

* cited by examiner

*Primary Examiner*—William A. Cuchlinski, Jr.
*Assistant Examiner*—Arthur D. Donnelly
(74) *Attorney, Agent, or Firm*—Kenyon & Kenyon

(57) ABSTRACT

In a process for determining the amount of time elapsed between stopping a motor vehicle engine and restarting the engine, when the engine is restarted, the time information representing the time when the engine was stopped is subtracted from the time information representing the time when the engine was restarted. The time information representing the respective times is obtained from an on-board clock that serves to display the time in the motor vehicle.

14 Claims, 1 Drawing Sheet

PROCESS FOR DETERMINING THE TIME ELAPSED BETWEEN STOPPING A MOTOR VEHICLE ENGINE AND RESTARTING THE ENGINE.

FIELD OF THE INVENTION

The present invention relates to a process for determining the time elapsed between stopping a motor vehicle engine and restarting the engine, where time information representing the time when the engine is stopped is stored, and when the engine is restarted, this information is related to the time information representing the time when the engine is started.

BACKGROUND INFORMATION

Knowing the time between stopping a motor vehicle engine and restarting the engine is important for various functions in engine control, especially when starting the engine, e.g., for controlling fuel delivery, ignition, etc., by an automotive controller.

A relatively accurate method of determining the time consists of determining the times corresponding to the time when the engine is stopped and the time when the engine is restarted, storing temporarily and determining the difference.

These times or the corresponding counter readings can be obtained, for example, from a software clock or a counter integrated into the automotive controller, for example.

However, using a software clock or a counter requires the automotive controller to continue running at least temporarily after the engine is stopped, which is a disadvantage in two regards. First, this could endanger the safety of the parked motor vehicle, and second, this would be a considerable burden on the battery in the vehicle, which could be a serious problem if the engine is stopped for a long time in particular.

One possible alternative to this would consist of equipping the automotive controller with a discrete clock module, the time information required to determine how long the engine has been turned off being supplied by this clock module. Although relatively little power is drained from the battery due to the comparatively low power consumption by the clock module even in continuous operation, this load cannot be disregarded completely. Even a low load on the battery can cause the battery to be discharged completely if the motor vehicle is stopped for a long period of time.

To prevent this, means can be provided to determine how much time has elapsed since the engine was shut down on the basis of the capacitor discharge. However, such a method of determining time is relatively inaccurate, and furthermore, it requires the use of components with extremely low tolerances.

SUMMARY OF THE INVENTION

An object of the present invention is to provide a process in which the time elapsed between stopping a motor vehicle engine and restarting the engine can be determined easily, accurately and with minimal power consumption.

According to the present invention, the time information representing the respective times is obtained from an on-board clock that serves to display the time in the motor vehicle.

First, this eliminates the necessity of permanent operation of the entire automotive controller or of those parts thereof that determine time, and second, this minimizes the hardware and/or software required for the automotive controller.

The on-board clock does not require any fundamental modification for the above-mentioned support of the automotive controller. Essentially, it is merely provided with a new function.

Meanwhile, it has become possible to determine the time elapsed between stopping a motor vehicle engine and restarting the engine very easily, with a high accuracy and minimal power consumption.

The determined elapsed time is used to control the engine, for example in the ways set forth above.

BRIEF DESCRIPTION OF THE DRAWING

The FIGURE shows a flow chart of an embodiment of the process according to the present invention.

DETAILED DESCRIPTION

Figure 1:
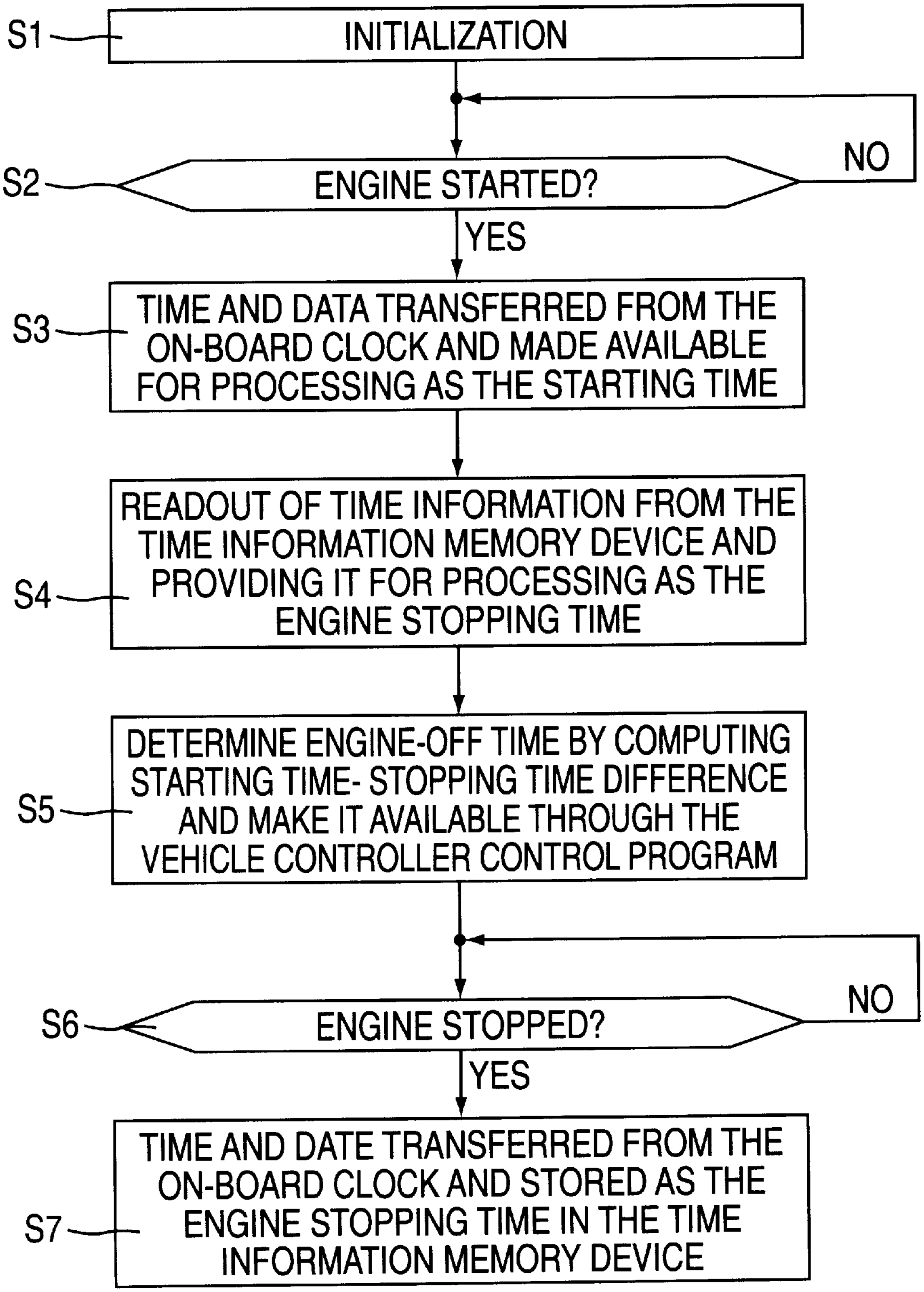

The flow chart shown in the FIGURE is implemented in an automotive controller, in the exemplary embodiment described herein.

Automotive controllers are used to control the engine, the brakes, etc. of a motor vehicle. As a rule, they have a microprocessor, microcontroller or similar device as the central control unit where a control program is run. The control program generates control signals, taking into account parameters (temperatures, engine speeds, flow rates, etc., measured by sensors) entered into the automotive controller, and these signals operate the control elements or actuators in the engine or the motor vehicle in a specific manner.

Input of measured parameters into the automotive controller and/or output of control signals from the automotive controller can take place via a network linking the electric and electronic components of the motor vehicle (CAN).

The automotive controller may also be connected via this network or by any other method to an on-board clock that is provided within the motor vehicle to display the current time. The on-board clock may be designed so that it is capable of supplying the time information representing the respective times on demand or continuously for transfer to the automotive controller.

The automotive controller is capable of receiving the time information thus supplied at defined times, in particular at the time when the engine is started and stopped, and processing it as a function of the events, where the event-based processing in the embodiment in question may include recording the time information corresponding to the time when the motor vehicle engine is stopped, i.e., the stopping time, in a time information memory module provided within the automotive controller, and using the time information corresponding to the time when the engine is restarted, i.e., the starting time, is essentially used directly for a calculation to determine how long the engine had been turned off, also taking into account the recorded time when the engine was stopped, i.e., to determine the period of time elapsed between when the engine of a motor vehicle was stopped and when it was restarted.

The time information storage device of the automotive controller for storing the amount of time the engine has been off is a battery-backed read-write memory (random-access memory) (RAM) in the embodiment described. The battery back-up is necessary so that the information stored when the motor vehicle engine is turned off will not be lost. When the motor vehicle is turned off or at any rate soon thereafter, the automotive controller is also shut down for safety reasons and to protect the battery. The battery used for continued power supply to the RAM may be a separate battery provided within the automotive controller or the main automotive battery. The power required for the RAM is negligible, especially since only an extremely low memory capacity is necessary to store just a single time (including the date).

As an alternative, however, the memory device may also be a reprogrammable non-volatile memory device such as an EPROM, an EEPROM, a flash EPROM, or the like, in which case the battery back-up may be omitted.

The transfer of the time information to the automotive controller and further processing of the time information are explained below on the basis of excerpts of a description of operation of the automotive controller with reference to the diagram in the FIGURE.

After being switched on, the automotive controller runs through an initialization routine (for example, in response to turning the ignition key in the ignition lock) to enter a defined initial state. The initialization phase corresponds to step S1 in the FIGURE.

From the initialization phase, the program advances to step S2, which determines whether the engine has been started. Step S2 is repeated in a loop until starting of the engine is detected.

The program then advances to step S3, where the current time and the current date are transferred to the automotive controller from the on-board clock provided outside the controller—optionally after first being requested—and are available there as the starting time for further processing.

Thereafter, i.e., in step S4, the time information stored in the time information memory device provided inside the automotive controller at the time when the engine was stopped last, i.e., the time information corresponding to the time when the motor was stopped last, is read out of the time information memory device and also made available for further processing as the stopping time.

In step S5, the information supplied in steps S3 and S4 is used to determine how long the engine has been turned off, i.e., the amount of time that has elapsed between turning off the engine and restarting it up, and this is done by determining the difference starting time—stopping time.

The calculated time during which the engine is off is then made available for use by control routines (not shown in the FIGURE) to be carried out in the automotive controller to control the engine, brake, etc. This is significant, especially in the starting phase, because an engine that is still entirely or partially at operating temperature requires a control that may differ somewhat from the control of a completely cold engine.

The next step, i.e., step S6, monitors whether or not the engine has been turned off again—e.g., by turning the ignition key. If this is not the case, the check is repeated until it is finally found that the engine has been turned off.

Then step S7 is carried out, where the current time and the current date are transferred to the automotive controller from the on-board clock provided outside the automotive controller—optionally after first being requested—and are stored there in the time information memory device to be used when the engine is restarted to calculate how long the engine has been turned off (steps S3 through S5). The information still stored in the time information memory device at this time is overwritten by the memory process in step S7, so the capacity of the time information memory device can be kept very low.

After storing the engine off time, the automotive controller can be turned off—unless it must continue running for some other reason. To determine how long the engine has been turned off, at any rate it is not necessary to keep the automotive controller in operation. Only the time information memory device may optionally require a power supply, but as mentioned above, this is so low as to be negligible.

The on-board clock provided outside the automotive controller which provides the required time information remains in operation even after the engine is stopped, so the time information supplied by it will always correspond to the current time. It is not a disadvantage to operate the on-board clock even when the engine is turned off since the on-board clock must run continuously anyway, even if it is not used to determine how long the engine has been turned off, so it can always display the current time and the current date.

Providing the on-board clock with a new function and using it in a new way for automatic control of the automotive controller make it possible to perform the determination of the amount of time that has elapsed between stopping a motor vehicle engine and restarting the engine using an extremely simple method, with very high accuracy and minimal power consumption.

What is claimed is:

1. A process for determining a time elapsed between stopping an engine of a motor vehicle and restarting the engine, the motor vehicle having an on-board clock for displaying a current time in the motor vehicle, comprising the steps of:

obtaining a first time when the engine was stopped from the on-board clock;

storing the first time;

obtaining a second time when the engine is restarted from the on-board clock; and determining the elapsed time as a function of the first and second times, when the engine is restarted.

2. The process according to claim 1, wherein the determining step includes the step of comparing the first time with the second time.

3. The process according to claim 1, further comprising the step of:

controlling the engine as a function of the determined elapsed time.

4. The process according to claim 1, wherein the determining step is performed in an automotive controller, and further comprising the step of controlling the motor vehicle in the automotive controller as a function of the determined elapsed time.

5. The process according to claim 4, wherein the on-board clock is arranged outside of the automotive controller and is constantly in operation regardless of an operating state of the engine and the automotive controller.

6. The process according to claim 4, wherein the automotive controller is electrically coupled to the on-board clock.

7. The process according to claim 4, wherein the first time is stored in a time information memory device inside the automotive controller.

8. The process according to claim 7, wherein the time information memory device includes a battery-backed RAM.

9. The process according to claim 1, wherein the elapsed time is determined by subtracting the first time from the second time.

10. The method of claim 1, wherein:

the on-board clock is coupled to a controller area network (CAN), the step of obtaining the first time is performed using the controller area network (CAN), and the step of obtaining the second time is performed using the controller area network (CAN).

11. An apparatus for determining a time elapsed between stopping an engine of a motor vehicle and restarting the engine, the motor vehicle having an on-board clock for displaying a current time in the motor vehicle, the apparatus comprising:

an arrangement for obtaining a first time when the engine is stopped from the on-board clock for displaying the current time in the motor vehicle;

an arrangement for storing the first time, wherein the arrangement includes at least one of a battery-backed-up RAM, an EPROM, an EEPROM and a flash EPROM;

an arrangement for obtaining a second time when the engine is started from the on-board clock for displaying the current time in the motor vehicle; and an arrangement for controlling at least one motor vehicle function and for determining the elapsed time based on a difference between the first time and the second time when the engine is restarted, wherein the arrangement for controlling is coupled to the on-board clock;

wherein the on-board clock is arranged outside of the arrangement for controlling and the on-board clock is constantly operating regardless of an operating state of the engine and the arrangement for controlling.

12. The apparatus of claim 11, wherein:

the on-board clock is coupled by a controller area network (CAN) to the arrangement for controlling, the arrangement for obtaining the first time obtains the first time using the controller area network (CAN), and the arrangement for obtaining the second time obtains the second time using the controller area network (CAN).

13. An apparatus for determining a time elapsed between stopping an engine of a motor vehicle and restarting the engine, the motor vehicle having an on-board clock for displaying a current time in the motor vehicle, the apparatus comprising:

means for obtaining a first time when the engine is stopped from the on-board clock for displaying the current time in the motor vehicle;

means for storing the first time, wherein the means for storing includes at least one of a battery-backed-up RAM, an EPROM, an EEPROM and a flash EPROM;

means for obtaining a second time when the engine is started from the on-board clock for displaying the current time in the motor vehicle; and means for controlling at least one motor vehicle function and for determining the elapsed time based on a difference between the first time and the second time when the engine is restarted, wherein the means for controlling is coupled to the on-board clock;

wherein the on-board clock is arranged outside of the means for controlling and the on-board clock is constantly operating regardless of an operating state of the engine and the means for controlling.

14. The apparatus of claim 13, wherein:

the on-board clock is coupled by a controller area network (CAN) to the means for controlling, the means for obtaining the first time obtains the first time using the controller area network (CAN), and the means for obtaining the second time obtains the second time using the controller area network (CAN).

* * * * *